US011416427B2

(12) United States Patent
Cai et al.

(10) Patent No.: US 11,416,427 B2
(45) Date of Patent: Aug. 16, 2022

(54) METHOD, DEVICE AND COMPUTER PROGRAM PRODUCT FOR INFORMATION PROCESSING

(71) Applicant: EMC IP Holding Company LLC, Hopkinton, MA (US)

(72) Inventors: Chaoqian Cai, Shanghai (CN); Frank Yifan Huang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 156 days.

(21) Appl. No.: 16/831,296

(22) Filed: Mar. 26, 2020

(65) Prior Publication Data

US 2021/0097012 A1 Apr. 1, 2021

(30) Foreign Application Priority Data

Sep. 30, 2019 (CN) .......................... 201910947255.1

(51) Int. Cl.
*G06F 13/00* (2006.01)
*G06F 13/22* (2006.01)
*G06F 9/54* (2006.01)
*G06F 9/48* (2006.01)
*G06F 13/362* (2006.01)

(52) U.S. Cl.
CPC ............ *G06F 13/22* (2013.01); *G06F 9/4887* (2013.01); *G06F 9/546* (2013.01); *G06F 13/3625* (2013.01)

(58) Field of Classification Search
CPC .... G06F 13/3625; G06F 9/4887; G06F 9/546; G06F 13/22

USPC ........................................................ 710/109
See application file for complete search history.

(56) References Cited

U.S. PATENT DOCUMENTS

| | | | |
|---|---|---|---|
| 6,744,780 B1* | 6/2004 | Gu ........................ | H04L 41/06 370/346 |
| 2004/0053578 A1* | 3/2004 | Grabon .................. | H04B 15/02 455/73 |
| 2005/0135409 A1* | 6/2005 | Janczak ................ | H04W 74/06 370/445 |
| 2014/0304553 A1* | 10/2014 | Gondi ................... | G06F 11/301 714/39 |
| 2017/0286159 A1* | 10/2017 | Thiruvengadachari ...................... G06F 9/4843 |
| 2019/0272108 A1* | 9/2019 | Elliott ................... | G06F 3/0653 |

* cited by examiner

*Primary Examiner* — Chun Kuan Lee
(74) *Attorney, Agent, or Firm* — Amin, Turocy & Watson, LLP (57) ABSTRACT

Information processing is disclosed. For instance, a first polling interval between a current polling operation and a previous polling operation is polled, the first polling interval indicating a time period from an end of the previous polling operation to a start of the current polling operation. An execution status of the current polling operation is obtained, the execution status indicating whether an object to be polled for the current polling operation is obtained. Further, based on the first polling interval and the execution status, a second polling interval is determined between the current polling operation and the next polling operation, the second polling interval indicating a time period from an end of the current polling operation to a start of the next polling operation. In this way, the solution can provide a stable and efficient adaptive polling.

20 Claims, 8 Drawing Sheets

METHOD, DEVICE AND COMPUTER PROGRAM PRODUCT FOR INFORMATION PROCESSING

RELATED APPLICATION

The present application claims the benefit of priority to Chinese Patent Application No. 201910947255.1, filed on Sep. 30, 2019, which application is hereby incorporated into the present application by reference herein in its entirety.

FIELD

Embodiments of the present disclosure generally relate to the field of information processing, and more specifically to a method, device and computer program product for adaptive polling.

BACKGROUND

The polling mechanism is a fundamental part of software engineering and has been applied in various scenarios from the design of network protocols to hardware drivers. Nowadays, the polling mechanism serves as an underlying mechanism for most streaming systems. In a conventional polling mechanism, a consumer of objects to be polled usually sends a poll request to a producer of the objects to be polled at a fixed interval to obtain the objects to be polled. However, such mechanism is not well suited for time-sensitive polling scenarios due to the fixed interval.

SUMMARY

Embodiments of the present disclosure provide a method, device and computer program product for information processing.

According to a first aspect of the present disclosure, there is provided a method for information processing. The method comprises: obtaining a first polling interval between a current polling operation and a previous polling operation, the first polling interval indicating a time period from an end of the previous polling operation to a start of the current polling operation; obtaining an execution status of the current polling operation, the execution status indicating whether an object to be polled for the current polling operation is obtained; and determining, based on the first polling interval and the execution status, a second polling interval between the current polling operation and the next polling operation, the second polling interval indicating a time period from an end of the current polling operation to a start of the next polling operation.

According to a second aspect of the present disclosure, there is provided an electronic device. The device comprises: at least one processing unit; and at least one memory. The at least one memory is coupled to the at least one processing unit and at least one memory. The at least one memory is coupled to the at least one processing unit and stores instructions to be executed by the at least one processing unit. The instructions, when executed by the at least one processing unit, cause the apparatus to perform acts, the acts comprise: obtaining a first polling interval between a current polling operation and a previous polling operation, the first polling interval indicating a time period from an end of the previous polling operation to a start of the current polling operation; obtaining an execution status of the current polling operation, the execution status indicating whether an object to be polled for the current polling operation is obtained; and determining, based on the first polling interval and the execution status, a second polling interval between the current polling operation and the next polling operation, the second polling interval indicating a time period from an end of the current polling operation to a start of the next polling operation.

According to a third aspect of the present disclosure, there is provided a computer program product that is tangibly stored on a non-transitory computer-readable medium and includes machine-executable instructions. The machine-executable instructions, when being executed, cause the machine to implement any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements in exemplary embodiments of the present disclosure.

Throughout the drawings, the same or similar reference symbols refer to the same or similar elements.

DETAILED DESCRIPTION OF EMBODIMENTS

Various embodiments of the present disclosure will be described as follows in greater detail with reference to the drawings. Although various embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

In computer science, polling has been historically known as a process of actively sampling the status of an external device synchronously. The polling target can be any source that can provide a response, for example, a hardware device, a pure software implementation, or the like. The polling mechanism is an essential part of software engineering and has been adopted in a variety of scenarios. For example, the polling mechanism has been used in the Exterior Gateway Protocol (EGP) for reachability updating: a router periodically polls its known neighbors for routing information. Polling mechanism has also been applied in the star network for maintaining orders. Another example is that the polling mechanism has been combined with traditional interrupt mechanism (event driven) in order to handle modern high-speed networks in Linux kernel, forming a so called NAPI (New API).

With the recent thriving of streaming computation, the polling mechanism finds its usage in more related applications due to the fact that most of the stream-based message storage systems work in a pull mode only. Traditionally, most of the message queue systems work in a push mode: the message proxy records the progress of each consumer and is responsible for notifying the consumer once any new message is available, while the consumer is required to register some kind of callback for message handling. The nature of the push mode puts a heavy burden on the message proxy, thus limiting its application in large scale data and high performance scenarios. Moreover, it is very hard for the message proxy to control the transmission rate especially in the case when the consumer is slower than the message proxy. In contrast, all progress managements are transferred to the consumer side in a pull mode, allowing a more efficient design for the message proxy. The downside of the pull mode is that the client has to poll the message actively.

A client operating at the pull mode typically keeps sending poll requests to a producer at a fixed interval (namely at a fixed frequency), checking for any new message. In some applications, the performance is not so sensitive to the exact value of the poll interval, thus choosing any interval falling in a reasonable range will make the application work as expected without any significant performance variation. In any time-sensitive polling scenario with efficiency requirements, the polling interval is critical to the application performance, e.g., when using the message storage as a communication channel.

Message storage as a communication channel is best explained by the following model: a producer and a corresponding consumer are linked by a shared polling queue (first-in-first-out). The producer keeps putting objects to be polled in the polling queue with a varying interval which is generally unpredictable, while the consumer is polling independently at the polling queue (possibly with sophisticated strategy), requiring retrieval of the objects to be polled efficiently without much delay. In a practical application, the producer usually corresponds to the message sender while the consumer corresponds to the message receiver, and the objects to be polled in the polling queue are the actual messages, e.g., service requests. The whole data path could be viewed as a one-direction channel which delivers messages from the producer to the consumer.

In this scenario, the consumer is usually expected to perceive the availability of a new message as soon as possible, since any delay in this procedure will result in a degradation of service quality. Choosing an appropriate polling interval under this scenario will result in a dilemma: an interval too large will result in a significant delay of the message discovery, while an interval too small will inevitably degrade the efficiency. This is because most of the polling operations will end up with nothing retrieved in the case of a small interval. Especially when the cost of individual polling operation becomes expensive, the problem will be worsened.

In addition, since the interval of generating the objects cannot be predicted, an optimal polling interval might not be selected. For example, the object generation interval in a real environment might vary significantly. Take the message channel as an example, the individual messages might be generated at milliseconds at busy times (e.g., during work days), while the channel might also be idle for minutes or even hours at some leisure times (e.g., on weekends). This means that any fixed polling interval selected cannot satisfy the two scenarios at the same time.

In order to at least partly solve one or more problems in the above and other potential problems, exemplary embodiments of the present disclosure provide a solution for information processing. In this solution, a first polling interval between a current polling operation and a previous polling operation and an execution status of the current polling operation are obtained. The first polling interval indicates a time period from an end of the previous polling operation to a start of the current polling operation. The execution status indicates whether an object to be polled for the current polling operation is obtained. A second polling interval between the current polling operation and the next polling operation is determined based on the first polling interval and the execution status. The second polling interval indicates a time period from an end of the current polling operation to a start of the next polling operation.

It can be seen that in the solution, the polling operations are not performed at a fixed polling interval. Instead, the polling interval should be adaptive according to a current situation, especially the interval of generating the objects. Intuitively, when a recent polling succeeds (i.e., at least one object to be polled has been polled), it is reasonable to try performing polling operations more frequently at a shorter polling interval. In contrast, it is better to perform polling operations less frequently at a longer polling interval if a recent polling fails (i.e., no object to be polled has been polled). That is to say, the polling interval matches the object generation interval. In this way, the present solution may provide a stable and efficient adaptive polling.

Implementation of Adaptive Polling

Figure 1:
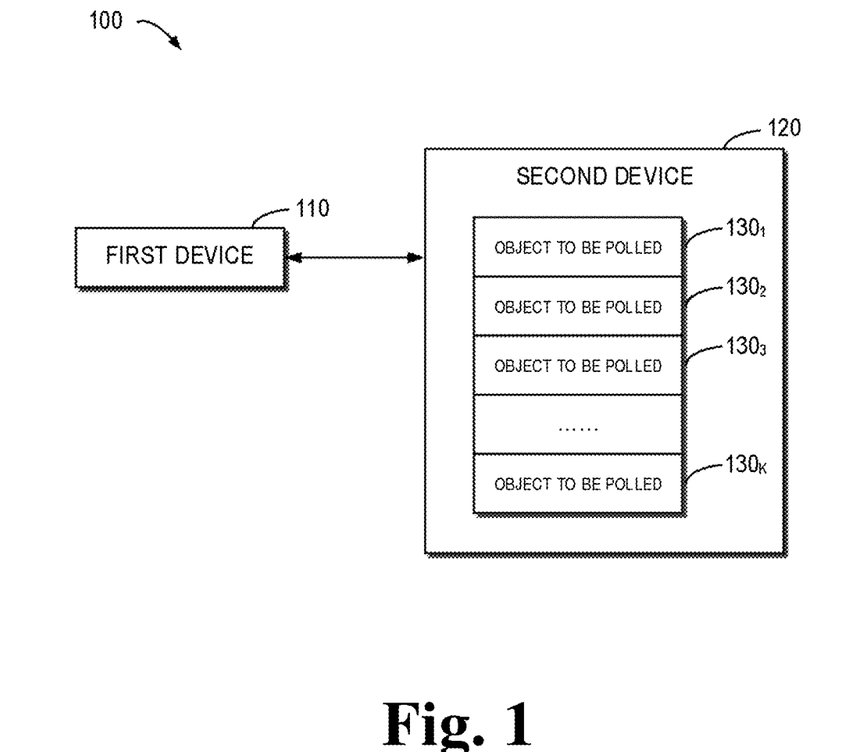
FIG. 1 illustrates a schematic diagram of an example of an information processing system according to an embodiment of the present disclosure.

Examples of the solution will be described below in more detail with reference to FIG. 1 through FIG. 8. FIG. 1 illustrates a schematic diagram of an example of an information processing system 100 according to an embodiment of the present disclosure. The information processing system 100 includes a first device 110 and second device 120. The first device 110 and the second device 120 may include, but are not limited to, any device having a computing capability such as a cloud computing device, a mainframe computer, a server, a personal computer, a desktop computer, a laptop computer, a tablet computer, and a personal digital assistant.

The second device 120 has one or more objects to be polled 1301-130K (hereinafter, collectively referred to as "object to be polled 130"), where K is an integer greater than 1. The first device 110 may be regarded as a consumer of the object to be polled 130, and the second device 120 may be regarded as a producer of the object to be polled 130. However, the roles of the first device 110 and the second device 120 are not limited thereto and may be interchangeable.

FIG. 1 only shows one first device 110 and one second device 120 for the purpose of clarity, but the number of the first device 110 and the second device 120 is not limited to this, and there may be a plurality of first devices 110 and a plurality of second devices 120.

In some embodiments, the second device 120 may put the object to be polled 130 into a polling queue. The first device 110 may perform a polling operation, for example, sending a polling request to the second device 120 to obtain the object to be polled 130 from the second device 120. The second device 120 may return to the first device 110 the object to be polled 130 for the polling operation. The polling interval at which the first device 110 performs the polling operation is adaptive. Hereinafter, the adaptive polling mechanism will be described with reference to FIG. 2.

Figure 2:
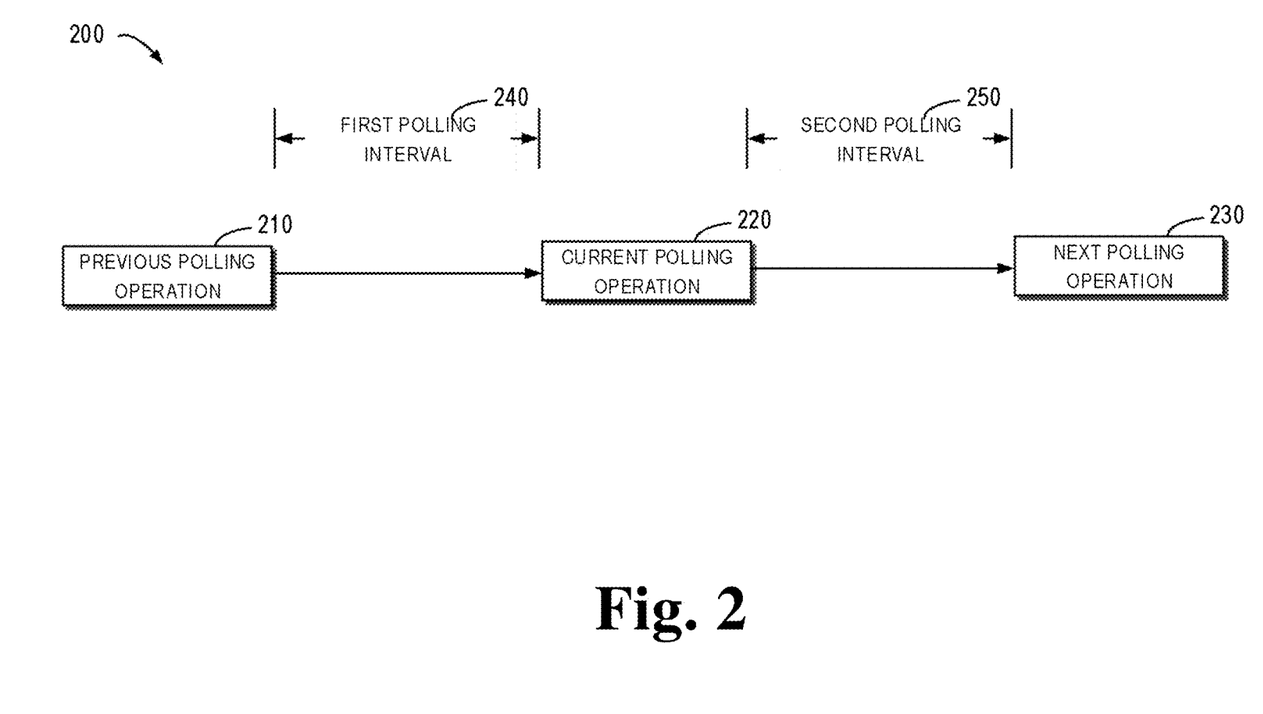
FIG. 2 illustrates a schematic diagram of an adaptive polling mechanism according to an embodiment of the present disclosure.

FIG. 2 illustrates a schematic diagram of an adaptive polling mechanism 200 according to an embodiment of the present disclosure. As shown in FIG. 2, the polling operations are performed in order, that is, the completion of one polling operation will trigger the scheduling of the next poll. For example, the completion of the previous polling operation 210 may trigger the current polling operation 220, and the completion of the current polling operation 220 may trigger the next polling operation 230. Therefore, the polling interval may be adjusted by controlling the time when the next polling operation occurs.

As stated above, in the adaptive polling mechanism, the polling operations are not performed at a fixed polling interval. Instead, the polling interval should be adaptive according to current situation. Intuitively, when a recent polling succeeds (i.e., at least one object to be polled has been polled), it is reasonable to try performing polling operations more frequently at a shorter polling interval. On the contrary, it is better to perform the polling operations less frequently at a longer polling interval if a recent polling fails (i.e., no object to be polled has been polled).

Based on this understanding, the first device 110 may determine a second polling interval 250 between a current polling operation 220 and a next polling operation 230 based on a first polling interval 240 between a previous polling operation 210 and the current polling operation 220 and an execution status about whether the current polling operation 220 is successfully performed. In this way, the polling interval may be adaptive according to the current situation, so that the polling operation may achieve high performance even for time-sensitive scenarios with efficiency requirements.

Figure 3:
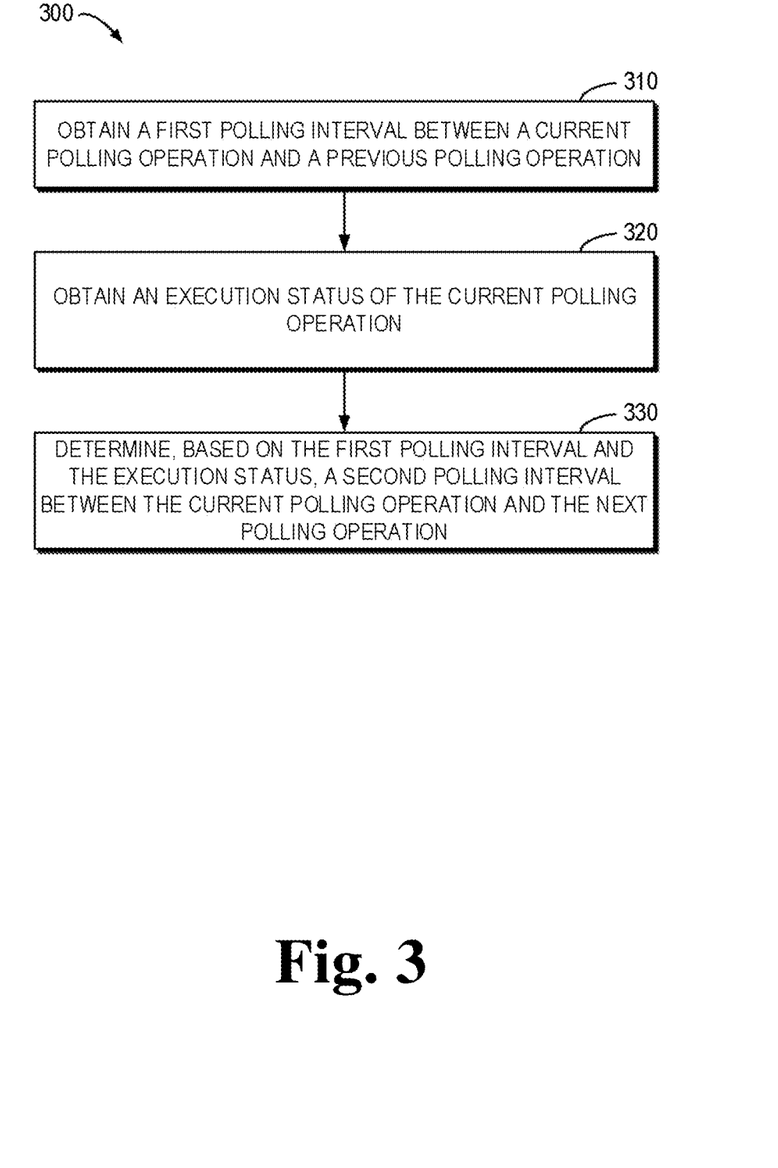
FIG. 3 illustrates a flowchart of a method for information processing according to an embodiment of the present disclosure.

FIG. 3 illustrates a flowchart of a method 300 for information processing according to an embodiment of the present disclosure. At 310, the first device 110 obtains the first polling interval 240 between the current polling operation 220 and the previous polling operation 210. The first polling interval 240 indicates a time period from the end of the previous polling operation 210 to the start of the current polling operation 220. At 320, the first device 110 further obtains the execution status of the current polling operation 220. The execution status indicates whether the object to be polled for the current polling operation 220 is obtained. At 330, the first device 110 determines the second polling interval 250 between the current polling operation 220 and the next polling operation 230 based on the first polling interval 240 and the execution status. The second polling interval 250 indicates a time period from the end of the current polling operation 220 to the start of the next polling operation 230.

Mathematically, the determination of the second polling interval 250 may be expressed as the following equation:

$$d_{i+1}=F_i d_i, F_i \in \{F_g, F_d\}, i \in \mathbb{N} \quad (1),$$

where i represents a number of the polling operation and is a natural number, $d_i$ represents the current polling interval, $d_{i+1}$ represents the next polling interval, and $F_i$ represents a control parameter for controlling the change of the polling interval. It can be seen that, because the change of the polling interval may be expressed in an exponential form, in the case of a significant change in the object generation interval, the polling interval may correspondingly change within a large range (may be several orders of magnitude), without too much lag. As a result, the determined polling interval can adapt to the change of the object generation interval in a timely and efficient manner.

The above Equation (1) has introduced the control parameter for controlling the change of the polling interval. The control parameter will be described below in detail. First, description will be provided on how to determine the direction of change of the polling interval (whether the polling interval increases or decreases).

Specifically, the change of the polling interval depends on the following three cases. In the first case, all recent $N_d$ polling operations have already successfully obtained objects to be polled, wherein $N_d$ is a positive integer, and $N_d \in \mathbb{N}^+$. This means that either the polling operations are not performed frequently enough and might cause the occurrence of piling of objects to be polled, or the polling interval has already completely matched the object generation interval now. In this case, the polling interval may be reduced to perform polling operations more frequently.

In the second case, all recent $N_g$ polling operations have failed without obtaining the objects to be polled, where $N_g$ is a positive integer, where $N_g \in \mathbb{N}^+$. This indicates that polling operations might be performed too frequently. In this case, the polling interval may be increased.

In the third case in addition to the first case and second case, whether to increase or decrease the polling interval is unclear. Hence, the polling interval may be maintained unchanged.

Herein, for convenience of discussion, let $N_g=N_d=1$. The configuration of $N_g=N_d=1$ will not require a record of the state for any past polling operations, since it depends only on the current polling. The main reason for introducing a configuration of Ng>1 or Nd>1 is to eliminate the impact caused by possible system jitters. This kind of configuration could be regarded as a conservative strategy in which the current polling interval is kept untouched unless some strong evidence is observed, which makes the changing of the polling interval more smooth, but also less responsive. It is noted that all discussions herein are based on the simple configuration with $N_g=N_d=1$, but most of the analysis and conclusions are also applicable for other more conservative configurations.

Based on this, in some embodiments, the first device 110 may obtain a first parameter for reducing the first polling interval 240 according to the determination of the execution status indicating that the object to be polled has already been obtained. The first device 110 may then determine the second polling interval 250 based on the first polling interval 240 and the first parameter. For example, in the case where the polling interval is reduced, $F_i$ may be set as a predefined positive real number constant $F_d$, where $F_d \in (0,1)$.

Similarly, in some embodiments, the first device 110 may obtain a second parameter for increasing the first polling interval according to the determination of the execution status indicating that the object to be polled has not been obtained. The first device 110 may then determine the second polling interval 250 based on the first polling interval 240 and the second parameter. For example, in the case where the polling interval is increased, $F_i$ may be set as a predefined positive real number constant $F_g$, where $F_g \in (1, +\infty]$.

Alternatively, Equation (1) may be expressed recursively as follows:

$$d_n = d_0 \Pi_{i=0}^{J-1} F_i, i \in N \quad (2),$$

where $d_0$ represents an initial polling interval, and J represents a total number of polling operations. Due to the adaptive polling mechanism, the initial polling interval $d_0$ may be chosen to be any reasonable positive real number.

In some embodiments, in order to prevent the polling interval from increasing or decreasing indefinitely, some predefined upper/lower bound limits may be imposed on the polling interval (e.g., $d_{i+1} \in [d_{min}, d_{max}]$, where $d_{min}$ represents the lower bound limit of the polling interval and $d_{max}$ represents the upper bound limit of the polling interval) so that the polling interval may be reasonably changed. For this reason, in the case where the polling is reduced, the computing device 110 may apply the first parameter to the first polling interval to obtain an intermediate polling interval. In the case where the intermediate polling interval is lower than a predetermined threshold, the predetermined threshold is determined as the second polling interval, whereas in the case where the intermediate polling interval exceeds the predetermined threshold, the intermediate polling interval is determined as the second polling interval. In this manner, the second polling interval does not become less than the predetermined threshold.

In the case where the polling interval is increased, the computing device 110 may apply the second parameter to the first polling interval to obtain the intermediate polling interval. In the case where the intermediate polling interval exceeds another predetermined threshold, the another predetermined threshold is determined as the second polling interval, whereas in the case where the intermediate polling interval is lower than the another predetermined threshold, the intermediate polling interval is determined as the second polling interval. In this way, the second polling interval does not become larger than another predetermined threshold.

Mathematically, the limitation of the polling interval may be expressed as:

$$d_{i+1} = \begin{cases} d_{min}, & F_i d_i < d_{min} \\ F_i d_i, & d_{min} \le F_i d_i \le d_{max} \\ d_{max}, & F_i d_i > d_{max} \end{cases} \quad (3)$$

In addition to the method of controlling the change of the polling interval described above, a more sophisticated machine learning method is also adapted to control the change of the polling interval, for example, reinforcement learning and other types of random methods.

In this manner, it is possible to allow the polling interval to be adjusted according to the polling interval and execution status of the previous polling operation, and allow the change of the polling interval always within a reasonable range, thereby implementing stable and efficient adaptive polling. In the following text, analysis and performance evaluation of the fixed polling mechanism and adaptive polling mechanism will be provided to prove the advantages of the adaptive polling mechanism.

Analysis of Fixed Polling

In order to properly evaluate the polling performance, some metrics may be defined first. One of the critical metrics for the polling operations is a waiting time. In the text, the waiting time may be identified as a time difference between placement of the objects to be polled into the polling queue by the second device 120 as the producer and the polling of the objects to be polled by the first device 110 as the consumer. In other words, the waiting time indicates a time period between entry of the object to be polled into the polling queue and leaving of the object to be polled from the polling queue. It can be seen that an average waiting time calculated over a collection of objects to be polled as samples during a period of running time may be used to reflect the performance of the polling mechanism statistically. Another important metric is the number of objects obtained. The number of obtained objects indicates the number of objects to be polled obtained in one polling operation. Similarly, the average number of the obtained objects to be polled may also be used to reflect the performance of the polling mechanism statistically.

In general, any polling mechanism should attempt to achieve a smaller waiting time while maintaining a reasonable number of the obtained objects. Ideally, the waiting time should be reduced to zero, which is a theoretical minimum that may be achieved through the polling mechanism. However, due to the time difference issue, even in a case where the object generation interval is fixed and the first device 110 as the consumer knows the object generation interval, this is very difficult in practice. On the other hand, the number of obtained objects should not be too small. A too small number of obtained objects means a low polling efficiency. Intuitively, a polling operation with a small polling interval might reduce the waiting time, but might cause a risk that the number of obtained objects is too small. Hence, it is necessary to weigh the waiting time and the number of obtained objects.

Figure 4:
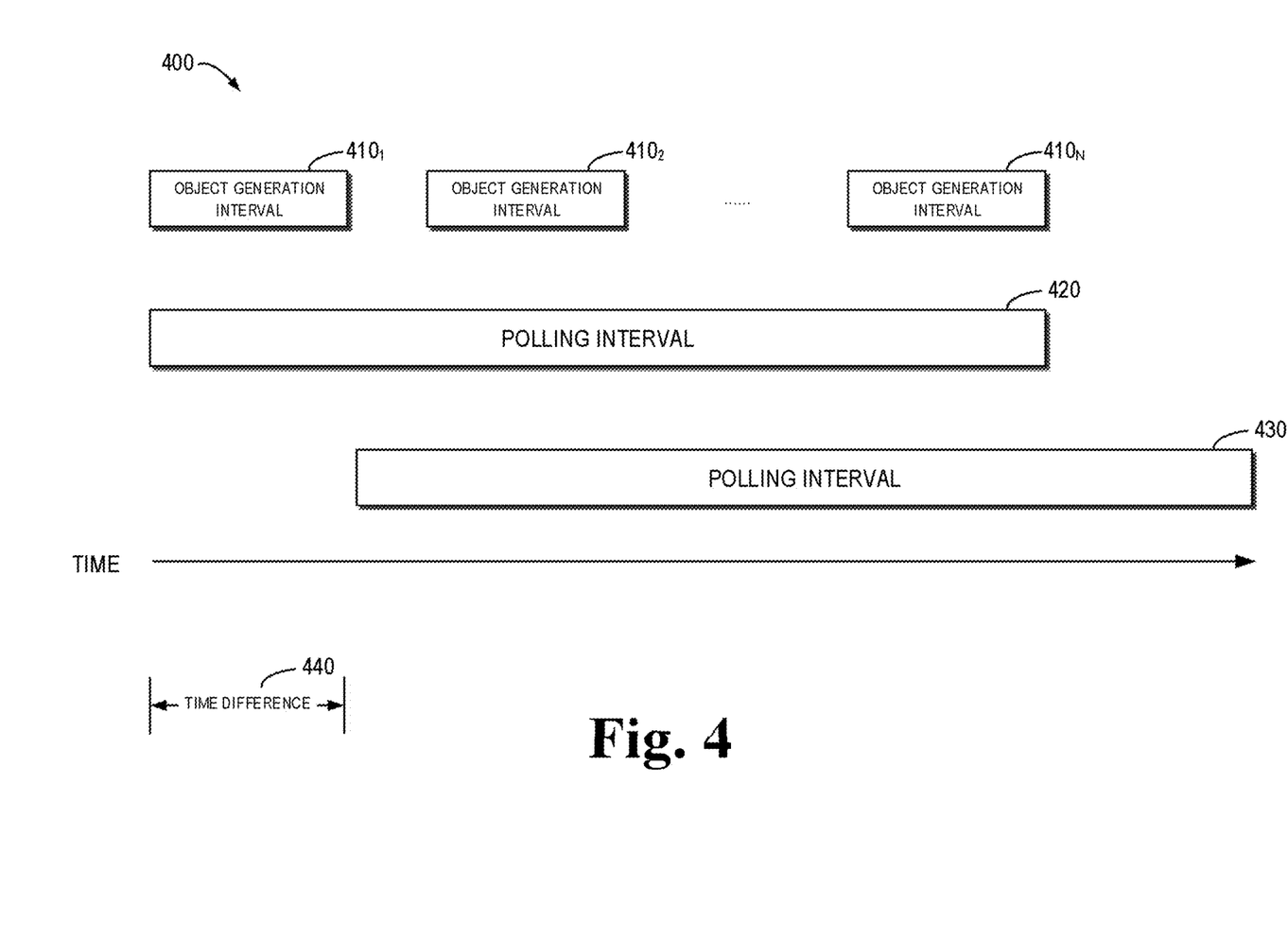
FIG. 4 illustrates a schematic diagram of a generation interval of an object to be polled and a polling interval according to an embodiment of the present disclosure.

FIG. 4 illustrates a schematic diagram 400 of a generation interval of an object to be polled and a polling interval according to an embodiment of the present disclosure. FIG. 4 shows intervals $410_1$-$410_N$ of generating N objects to be polled (referred to as "object generation interval 410" hereunder), a polling interval 420 in alignment with the object generation interval 410, and a polling interval 430 not in alignment with the object generation interval 410. The object generation interval 410 indicates a time interval at which the second device 120 as the producer places the objects to be polled into the polling queue. The polling interval 430 indicates a time interval at which the first device 110 as the consumer polls the objects to be polled. Since the polling interval 430 is not in alignment with the object generation interval 410, there is a time difference 440 between the polling interval 430 and the object generation interval 410.

In a simple example scenario of the fixed polling mechanism, both the first device 110 and second device 120 operate at a fixed interval. That is, the first device 110 performs the polling operation at a fixed polling interval, whereas the second device 120 operates at a fixed object generation interval.

First, thoughts are given to a case where the object generation interval is smaller than the polling interval. It may be assumed that the object generation interval is in alignment with the polling interval, i.e., the following equation is satisfied:

$$D_C = nD_P, n \in \mathbb{N}^+, \text{ where } D_P \leq D_C \quad (4),$$

where $D_C$ represents the polling interval, $D_P$ represents the object generation interval, and n represents the number of object generation intervals and is a positive integer.

If the object generation interval is not in alignment with the polling interval, it is always possible to find a least common multiple (LCM) of $D_P$ and $D_C$ to achieve alignment. Intuitively, this means that n objects to be polled are accumulated in a single polling operation. Under this assumption, the average waiting time is calculated directly as follows:

$$\overline{d_s} = \frac{\overbrace{0 + D_P + 2D_P + \ldots + (n-1)D_P}^{n \text{ items}}}{n}, \quad (5)$$

$$= \frac{D_P}{n} \sum_{i=1}^{n-1} i$$

$$= \frac{n-1}{2} D_P$$

where $\overline{d_s}$ represents the average waiting time.

In fact, even if the Equation (4) is satisfied, there might be a time difference 440 between the object generation interval and the polling interval. This means that the first device 110 and second device 120 are not completely synchronized. A model may be built for such a scenario by adding a time difference item into the average waiting time calculated from Equation (5):

$$\overline{d_s} = \frac{n-1}{2} D_P + \varepsilon, \quad (6)$$

where $\varepsilon$ represents a time difference and may be a random variable. For example, it is possible to suppose $\varepsilon$ complies with uniform distribution in a range of $[0, D_P]$, and thereby obtain an expected value of the average waiting time:

$$\mathbb{E}(\overline{d_s}) = \mathbb{E}\left(\frac{n-1}{2} D_P + \varepsilon\right), \quad (7)$$

$$= \frac{n-1}{2} D_P + \mathbb{E}(\varepsilon)$$

$$= \frac{n-1}{2} D_P + \frac{1}{2} D_P$$

$$= \frac{n}{2} D_P$$

where $\mathbb{E}$ represents solving the expected value.

Equation (5) and Equation (7) both indicate that the average waiting time $\overline{d_s}$ is related to the number n of the object generation intervals $D_P$. This means that the fixed polling mechanism usually exhibits a poor performance in practical applications. This is because if the difference between the polling interval Dc and the object generation interval $D_P$ is increasingly larger, the difference will cause a higher waiting time $\overline{d_s}$.

On the other hand, similar analysis may be performed for the case where the object generation interval $D_P$ is larger than the polling interval $D_C$. If it is permissible to neglect the time difference $\varepsilon$, the average waiting time $\overline{d_s}$ is zero in this case. Otherwise, the average waiting time $\overline{d_s}$ is equal to the time difference in the range of $[0, D_C]$. It can be seen that the average waiting time $\overline{d_s}$ depends on the time difference e. If the negative impact of the time difference $\varepsilon$ is to be reduced, the configuration $D_P \gg D_C$ needs to be used. However, a main drawback of this configuration is that most of polling operations will not obtain any object to be polled finally (the polling operation fails), thereby cause a very small number of obtained objects. This is very inefficient and may be considered a waste of computing resources.

Analysis of Adaptive Polling

In the following, an intuitive analysis of adaptive polling will be performed. A successful polling operation will reduce the polling interval for the next polling operation, while a failed polling operation will increase the polling interval. This allows the polling interval to be close to the object generation interval. After a long run, with a simple configuration of $N_g = N_d = 1$, the polling interval will tend to bounce between some values near the object generation interval. Since the increase/decrease parameters $F_g/F_d$ are usually not very large, the bounce value does not differ much from the actual object generation interval. This proves the capability of the adaptive polling mechanism: regardless of the object generation interval, the polling interval will not be far from the actual object generation interval. In addition, another major advantage of the adaptive polling mechanism is that it is substantially not affected by the time difference issue.

Furthermore, the upper limit of the average waiting time of the adaptive polling mechanism may be obtained. Under the conditions $F_0 = F_g$ (where $F_0$ represents an initial parameter), the polling interval $d_i$ of any polling operation satisfies the following equation:

$$d_i \leq F_g D_P, \forall i \in \mathbb{N} \quad (8).$$

Before giving a precise proof of Equation (8), it is required to give a new view for $d_i$. Mathematically, $d_i$ could be regarded as an infinite sequence of real numbers, and $d_m$ represent the maximum of $d_i$ and $d_m$ should satisfy the following equation:

$$d_{m-1} < d_m, d_m > d_{m+1}, m = \arg\max_{i \in \mathbb{N}} d_i. \quad (9)$$

The existence of the maximum is guaranteed by the fact that $D_P$ is bounded, and hence it is impossible for $d_i$ to increase indefinitely when $F_g > 1$. The initial condition $F_0 = F_g$ guarantees that the maximum value never happens in do. In practice, this initial condition could be easily satisfied by either of the following operations: a) before the first polling operation, insert an artificial or dummy polling operation which always fails; or truncate the initial part of sequence $d_i$ until a polling operating making the polling interval increase is found. Since both $d_0$ and $D_P$ are bounded, this truncation may be implemented by removing finite number of elements from the beginning of the sequence $d_i$.

Then, the following may be obtained in conjunction with Equation (8) and Equation (9):

$$d_i \leq d_m \leq F_g D_P \quad (10).$$

The left part of Equation (10) is obviously true by definition while it is possible to prove the right part of Equation (10) using a proof by contradiction. Assume that $d_m > F_g D_P$, $d_{m-1} > D_P$ because $F_{i-1} = F_g > 1$ (as stated above, the i−1$^{th}$ polling operation fails, and the polling interval increases). But this is a contradictory result by nature since any polling operation scheduled with a polling interval $d_i > D_P$ is guaranteed to succeed (there are always some objects to be polled accumulated in the polling queue after an interval greater than $D_P$) and it is impossible to cause the polling interval to increase. This contradiction implies the incorrectness of the previous assumption, and hence the correctness of Equation 10 and Equation 8.

Therefore, Equation 8 gives an upper bound limit of the average waiting time in the adaptive polling mechanism, as follows:

$$d_S \leq F_g D_P \quad (11)$$

Compared with the fixed polling mechanism, Equation (11) shows a great advantage of the adaptive polling mechanism. The slope is a constant $F_g$ under control no matter how $D_P$ varies in Equation (11), compared with equation 5 in which the slope depends on a ratio of $D_C$ to $D_P$.

Performance Evaluation of Fixed Polling

For the purpose of better demonstrating the performance, a series of simulation experiments have been carried out for both the fixed polling mechanism and the adaptive polling mechanism. There are two kinds of participants in the simulation: the second device 120 as the producer and the first device 110 as the consumer who are linked by a polling queue. The second device 120 is responsible for putting objects to be polled in the polling queue while the first device 110 may obtain the object to be polled from the polling queue with different polling solutions. When the objects to be polled have a timestamp when put into the queue, the waiting time may be calculated.

Figure 5:
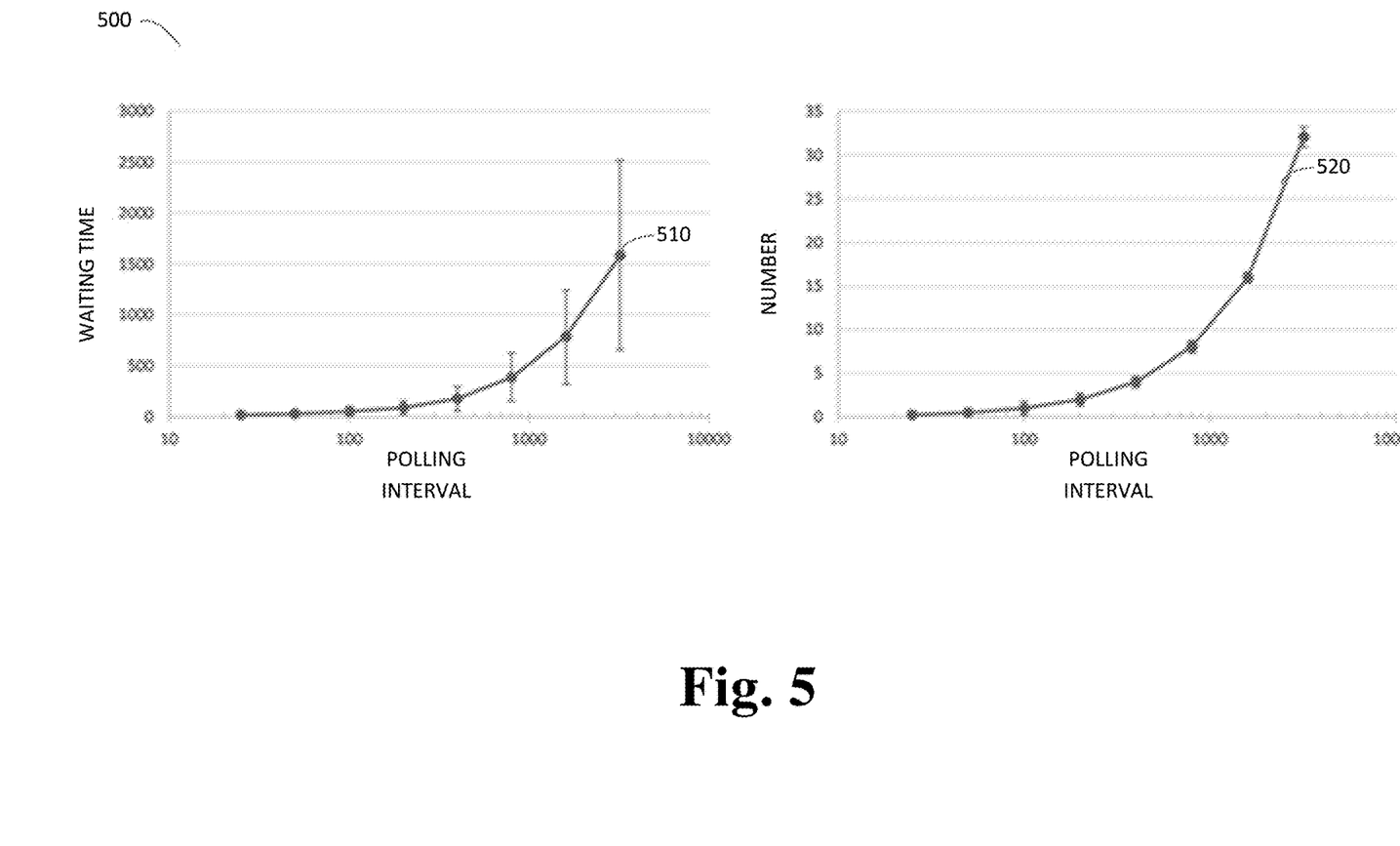
FIG. 5 illustrates a schematic diagram of performance of a fixed polling mechanism.

FIG. 5 illustrates a schematic diagram 500 of the performance of a fixed polling mechanism. In the example shown in FIG. 5, a fixed object generation interval of 100 ms is used, and the number of samples is 500. A curve 510 indicates performance as measured by the average waiting time, and the curve 520 indicates the performance as measured by the average number of obtained objects.

As may be seen from FIG. 5, both the waiting time and the number of obtained objects increase with the polling interval. The curve 510 shows a serious disadvantage of the fixed polling mechanism: if the polling interval is not selected correctly, the average waiting time will deviate significantly from the object generation interval (100 ms). It can be seen that the average waiting time may easily increase to several orders of magnitude greater than the object generation interval, which is generally unacceptable in practice. As long as the polling interval is fixed, this disadvantage is unavoidable: once the polling interval deviates from the object generation interval, the waiting time increases accordingly. In addition, according to Equation (5), there is theoretically no upper limit for the waiting time, because the object generation interval is usually unpredictable in the actual environment.

On the other hand, if the polling interval is selected too small, the average number of obtained objects will tend to be zero, as shown by a curve 520. The extremely small number of obtained objects indicates that polling efficiency is very low and that most of the computing resources have been wasted. Roughly, the experimental results of the waiting time and the number of obtained objects are matched with Equation (5) and Equation (7).

Performance Evaluation of Adaptive Polling

As a comparison, a similar simulation experiment was carried out for the adaptive polling solution. The experiment had the same participants and employed a fixed object generation interval of 100 ms and 500 samples. In addition, the experiment chose a simple configuration of $N_g = N_d = 1$ to avoid bringing too much complexity for subsequent analysis. An attempt was made to use symmetric first parameter $F_g$ and second parameter $F_d$ to obtain performance statistics. If the pair of the first parameter $F_g$ and the second parameter $F_d$ satisfies the following relationship, they are called symmetric:

$$F_g \cdot F_d = 1 \quad (12).$$

This symmetry ensures that the growth and decline operation are equally important in the aspect of affecting the polling interval: the effect of a growth operation could be canceled out by a decline operation, and vice versa. An initial polling interval $d_0 = 10$ was chosen which is far away from the object generation interval in order to avoid any possible bias.

Figure 6:
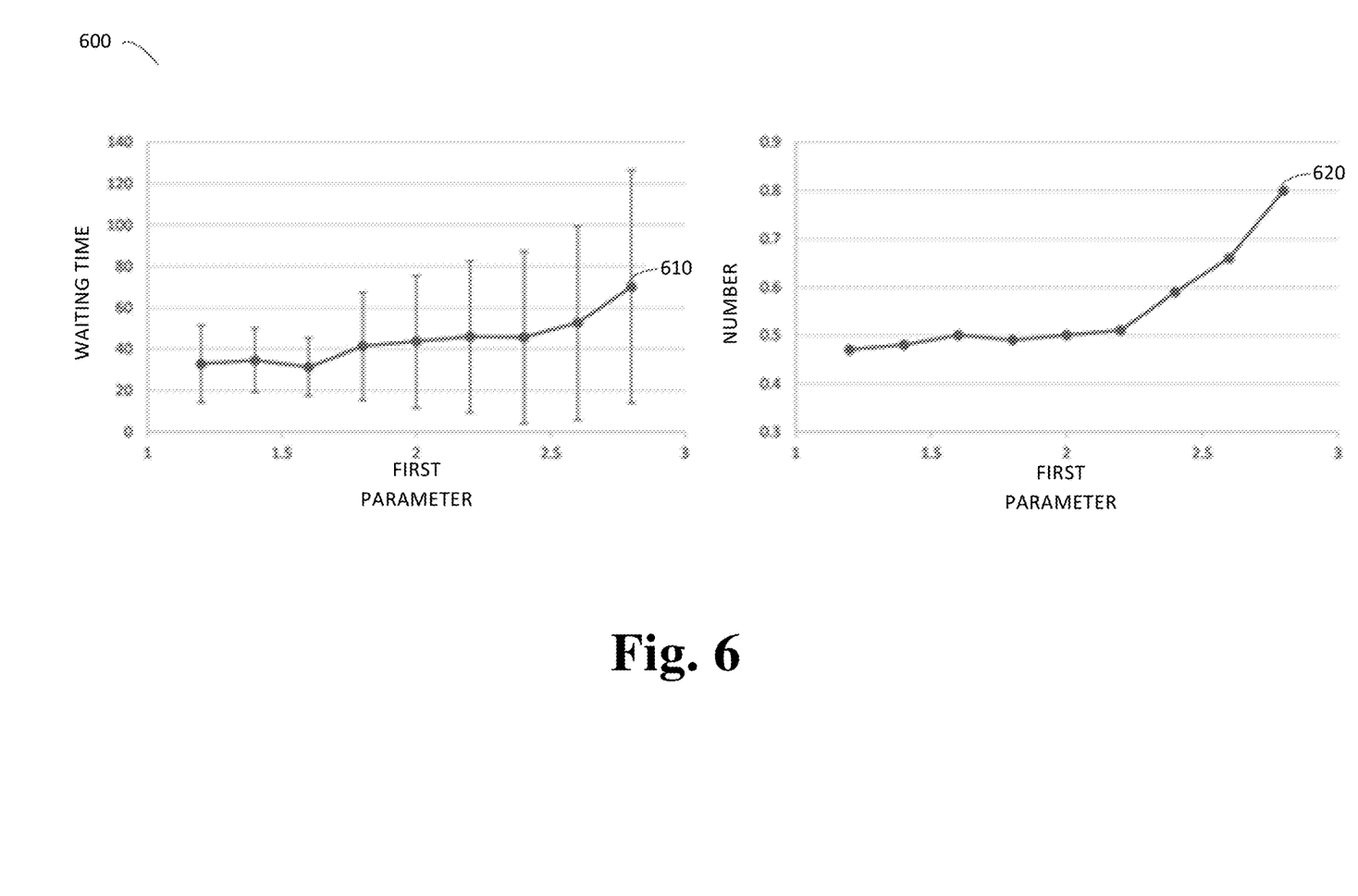
FIG. 6 illustrates a schematic diagram showing performance of an adaptive polling mechanism according to an embodiment of the present disclosure.

FIG. 6 illustrates a schematic diagram 600 showing performance of an adaptive polling mechanism according to an embodiment of the present disclosure. A curve 610 indicates the performance measured by the average waiting time, while a curve 620 indicates the performance measured by the average number of obtained objects.

It can be seen that except for the case where the first parameter $F_g$ is large, in most other cases, the average waiting time is less than 50 ms. This is a good result because in most cases, the average waiting time does not exceed half the object generation interval.

The number of obtained objects demonstrates a similar trend. In most other cases except for the case where the first parameter $F_g$ is large, the number of obtained objects stabilizes at around 0.5. After all, the number of obtained objects count is well under control: it never increases unbounded as long as the first parameter $F_g$ is bounded.

Figure 7:
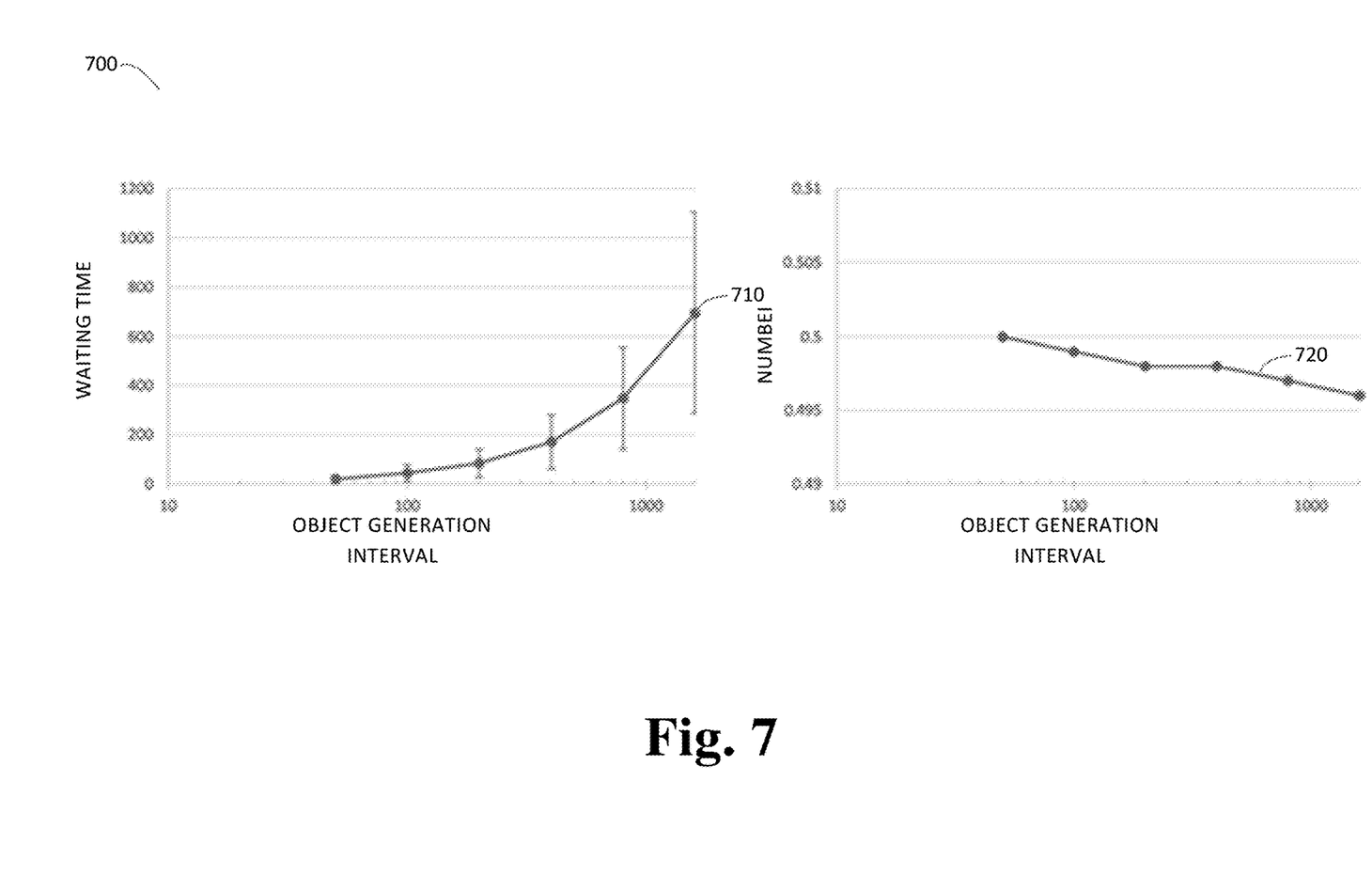
FIG. 7 illustrates another schematic diagram of performance of an adaptive polling mechanism according to an embodiment of the present disclosure.

A further simulation experiment was performed in order to demonstrate the performance of the adaptive polling mechanism under various object generation intervals. The experiment also had the same participants and employed 500 samples. In the experiment, the adaptive polling mechanism was configured with $N_g = N_d = 1$, $d_0 = 10$ as before. $F_g$ and $F_d$ were chosen to be symmetrical with $F_g = 2$. FIG. 7 illustrates the performance at various object generation intervals. A curve 710 indicates the performance measured by the average waiting time, while a curve 720 indicates the performance measured by the average number of obtained objects.

As may be seen, the average waiting time linearly increases with the object generation interval, but the slope is relatively small: the average waiting time never exceeds half of the object generation interval no matter how the object generation interval varies in scale. This is a huge improvement compared with the result in FIG. 5 which demonstrates an unbounded average waiting time (compared with the object generation interval). Moreover, the average number of obtained objects is stable around 0.5 even if the object generation interval varies in several orders of magnitude, which demonstrates the ability of the adaptive polling mechanism to maintain the efficiency regardless of the dramatic variation of the object generation interval.

Although the object generation interval is fixed in examples, the results obtained in the text are also applicable for variable object generation intervals in a practical environment. From a mathematical view, any interval varying over time could be further divided into many finite intervals, in which the object generation interval could be regarded as fixed, as long as the interval is fine enough. As a consequence, the results obtained in the text are applicable for more common cases in practice.

Figure 8:
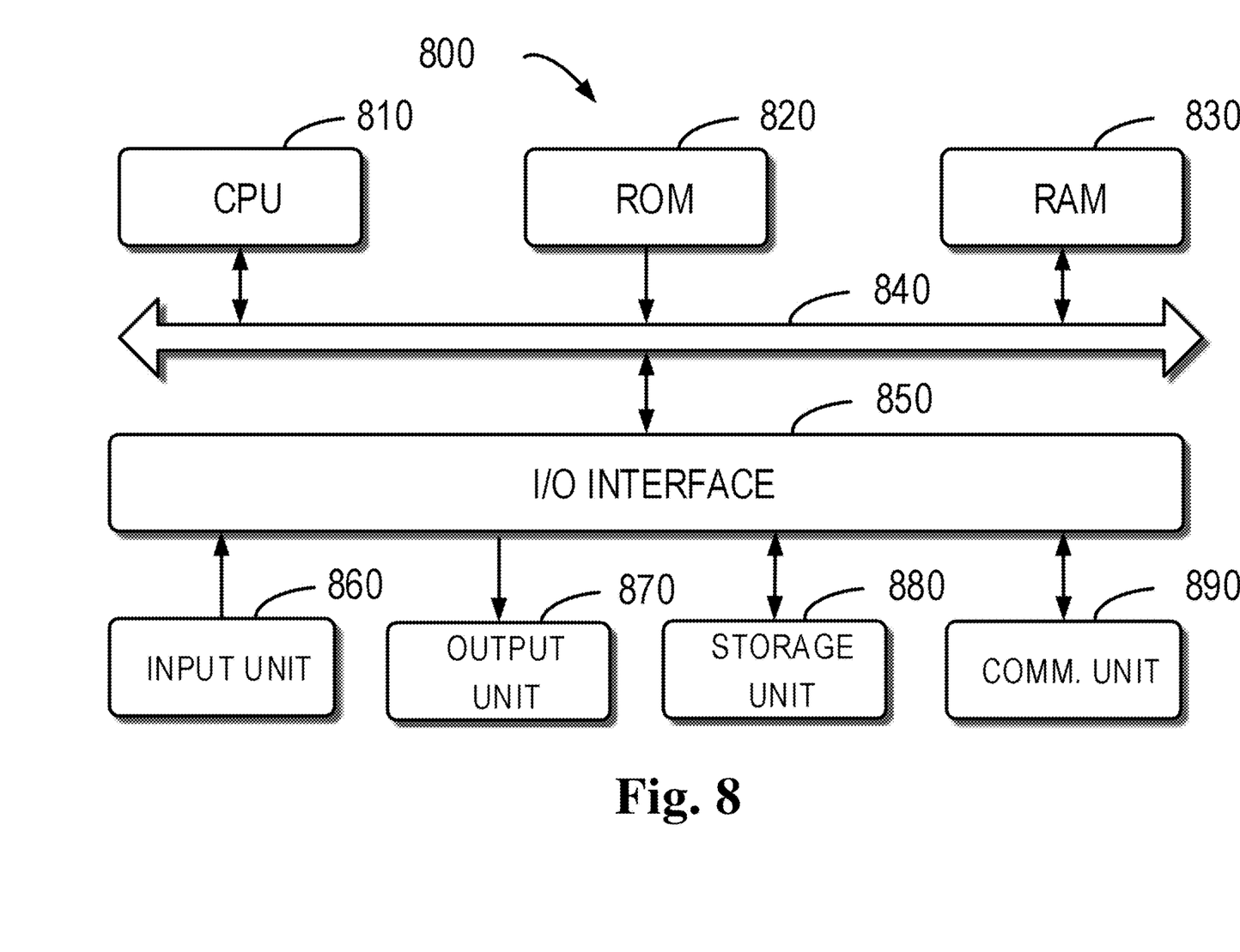
FIG. 8 illustrates a schematic block diagram of an example device that can be used to implement embodiments of the present disclosure.

FIG. 8 is a schematic block diagram of an example device 800 that can be used to implement embodiments of the present disclosure. For example, the first device 110 shown in FIG. 1 may be implemented by the device 800. As shown in FIG. 8, the device 800 comprises a central processing unit (CPU) 810 which is capable of performing various processes in accordance with computer program instructions stored in a read only memory (ROM) 820 or computer program instructions loaded from a storage unit 880 to a random access memory (RAM) 830. In the RAM 830 are stored various programs and data as required by operation of the device 800. The CPU 810, the ROM 820 and the RAM 830 are connected to one another via a bus 840. An input/output (I/O) interface 850 is also connected to the bus 840.

The following components in the device 800 are connected to the I/O interface 850: an input unit 860 including a keyboard, a mouse, or the like; an output unit 870 such as various types of displays and speakers; a storage unit 880 such as a magnetic disk or optical disk; and a communication unit 890 such as a network card, a modem, a wireless communication transceiver or the like. The communication unit 890 allows the device 800 to exchange information/data with other devices via a computer network such as the Internet and/or various telecommunication networks.

The processing unit 810 performs various method and processes described above, for example method 300. For example, in some embodiments, the method 300 may be implemented as a computer software program, which is tangibly contained in a machine-readable medium, for example the storage unit 880. In some embodiments, part or all of the computer program may be loaded and/or installed on the device 800 via ROM 820 and/or communication unit 890. When the computer program is loaded in the RAM 830 and executed by CPU 810, one or more acts of the method 300 described above may be executed.

The present disclosure may be a method, apparatus, system and/or computer program product. The computer program product may include a computer-readable medium on which computer-readable program instructions for executing various aspects of the present disclosure are embodied.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for information processing, comprising:
    obtaining, by a system comprising a processor, a first polling interval between a current polling operation and a previous polling operation, the first polling interval indicating a time period from an end of the previous polling operation to a start of the current polling operation;
    obtaining, by the system, an execution status of the current polling operation, the execution status indicating whether an object to be polled for the current polling operation is obtained;
    based on the execution status of the current polling operation, identifying, by the system, an object obtaining interval between the object to be polled and a previously polled object; and
    selecting, by the system, based on the first polling interval and the execution status, a second polling interval between the current polling operation and a next polling operation, wherein the second polling interval is selected to align the second polling interval with the object obtaining interval, and wherein the second polling interval corresponds to a time period from an end of the current polling operation to a start of the next polling operation.

2. The method according to claim 1, wherein the selecting the second polling interval is further based on a first parameter for reducing the first polling interval, wherein the second polling interval is selected between the first polling interval and the first parameter.

3. The method according to claim 1, wherein the second polling interval is selected to achieve a selected alignment of the second polling interval with the object obtaining interval, wherein the selected alignment is selected to reduce a delay in polling below a threshold delay.

4. The method according to claim 1, wherein the determining the second polling interval comprises:
    in accordance with a determination that the execution status indicates that the object to be polled has not been obtained, obtaining a second parameter for increasing the first polling interval; and
    determining the second polling interval based on the first polling interval and the second parameter.

5. The method according to claim 1, wherein the second polling interval is selected to achieve a selected alignment based on a determined least common multiple of the first polling interval and the object obtaining interval.

6. The method according to claim 1, wherein the object to be polled is obtained from a polling queue, and the method further comprises:
    determining, by the system, a waiting time of the object to be polled, the waiting time indicating a time period between entry of the object to be polled into the polling queue and leaving of the object to be polled from the polling queue; and
    determining, by the system, based on the waiting time, a performance associated with the current polling operation.

7. The method according to claim 1, further comprising:
    determining, by the system, a number of all objects to be polled obtained by the current polling operation; and
    determining, by the system, based on the number, a performance associated with the current polling operation.

8. A device, comprising:
    at least one processing unit;
    at least one memory coupled to the at least one processing unit and storing instructions to be executed by the at least one processing unit, the instructions, when executed by the at least one processing unit, causing the device to perform acts, the acts comprising:
        obtaining a first polling interval between a current polling operation and a previous polling operation, the first polling interval indicating a time period from an end of the previous polling operation to a start of the current polling operation,
        obtaining an execution status of the current polling operation, the execution status indicating whether an object to be polled for the current polling operation is obtained,
        based on the execution status of the current polling operation, identifying, by the system, an object obtaining interval between the object to be polled and a previously polled object, and
        determining, based on the first polling interval and the object obtaining interval, a second polling interval between the current polling operation and a next polling operation, wherein the second polling interval is determined to align the second polling interval with the object obtaining interval, and wherein the second polling interval corresponds to a time period from an end of the current polling operation to a start of the next polling operation.

9. The device according to claim 8, wherein the determining the second polling interval comprises:
   in accordance with a determination that the execution status indicates that the object to be polled has been obtained, obtaining a first parameter for reducing the first polling interval; and
   determining the second polling interval based on the first polling interval and the first parameter.

10. The device according to claim 9, wherein the determining the second polling interval based on the first polling interval and the first parameter comprises:
    applying the first parameter to the first polling interval to obtain an intermediate polling interval;
    in accordance with a first determination that the intermediate polling interval is lower than a predetermined threshold, determining the predetermined threshold as the second polling interval; and
    in accordance with a second determination that the intermediate polling interval exceeds the predetermined threshold, determining the intermediate polling interval as the second polling interval.

11. The device according to claim 8, wherein the determining the second polling interval comprises:
    in accordance with a determination that the execution status indicates that the object to be polled has not been obtained, obtaining a second parameter for increasing the first polling interval; and
    determining the second polling interval based on the first polling interval and the second parameter.

12. The device according to claim 11, wherein the determining the second polling interval based on the first polling interval and the second parameter comprises:
    applying the second parameter to the first polling interval to obtain an intermediate polling interval;
    in accordance with a first determination that the intermediate polling interval exceeds the predetermined threshold, determining the predetermined threshold as the second polling interval; and
    in accordance with a second determination that the intermediate polling interval is lower than the predetermined threshold, determining the intermediate polling interval as the second polling interval.

13. The device according to claim 8, wherein the object to be polled is obtained from a polling queue, and the acts further comprise:
    determining a waiting time of the object to be polled, the waiting time indicating a time period between entry of the object to be polled into the polling queue and leaving of the object to be polled from the polling queue;
    determining, based on the waiting time, a performance associated with the current polling operation.

14. The device according to claim 8, where the acts further comprise:
    determining a number of all objects to be polled obtained by the current polling operation; and
    determining, based on the number, a performance associated with the current polling operation.

15. A computer program product which is tangibly stored on a non-transitory computer-readable medium and comprises machine-executable instructions, the machine-executable instructions, when executed, causing a machine to implement operations, comprising:
    obtaining a first polling interval between a current polling operation and a previous polling operation, the first polling interval indicating a time period from an end of the previous polling operation to a start of the current polling operation;
    obtaining an execution status of the current polling operation, the execution status indicating whether an object to be polled for the current polling operation is obtained;
    based on the execution status of the current polling operation, identifying, by the system, an object interval between the object to be polled and a previously polled object;
    determining, based on a least common multiple of the first polling interval and the object interval, a second polling interval between the current polling operation and a next polling operation, the second polling interval controlling a time period from an end of the current polling operation to a start of the next polling operation.

16. The computer program product according to claim 15, wherein the determining the second polling interval comprises:
    in accordance with a determination that the execution status indicates that the object to be polled has been obtained, obtaining a first parameter for reducing the first polling interval; and
    determining the second polling interval based on the first polling interval and the first parameter, comprising:
      applying the first parameter to the first polling interval to obtain an intermediate polling interval,
      in accordance with a first determination that the intermediate polling interval is lower than a predetermined threshold, determining the predetermined threshold as the second polling interval, and
      in accordance with a second determination that the intermediate polling interval exceeds the predetermined threshold, determining the intermediate polling interval as the second polling interval.

17. The computer program product according to claim 15, wherein the determining the second polling interval comprises:
    in accordance with a determination that the execution status indicates that the object to be polled has not been obtained, obtaining a second parameter for increasing the first polling interval; and
    determining the second polling interval based on the first polling interval and the second parameter.

18. The computer program product according to claim 17, wherein the determining the second polling interval based on the first polling interval and the second parameter comprises:
    applying the second parameter to the first polling interval to obtain an intermediate polling interval;
    in accordance with a first determination that the intermediate polling interval exceeds the predetermined threshold, determining the predetermined threshold as the second polling interval; and
    in accordance with a second determination that the intermediate polling interval is lower than the predetermined threshold, determining the intermediate polling interval as the second polling interval.

19. The computer program product according to claim 15, wherein the object to be polled is obtained from a polling queue, and the method further comprises:

determining a waiting time of the object to be polled, the waiting time indicating a time period between entry of the object to be polled into the polling queue and leaving of the object to be polled from the polling queue; and
determining, based on the waiting time, a performance associated with the current polling operation.

20. The computer program product according to claim 15, further comprising:
determining a number of all objects to be polled obtained by the current polling operation; and
determining, based on the number, a performance associated with the current polling operation.

\* \* \* \* \*